WEB SUPPLY MOUNT FOR WEB HANDLING APPARATUS

Filed June 30, 1965 2 Sheets-Sheet 1

Inventors:
William E. Soong
Jack W. Thomsen
By Barry L. Clark
John E. Reele Jr. Attys

WEB SUPPLY MOUNT FOR WEB HANDLING APPARATUS

Filed June 30, 1965 2 Sheets-Sheet 2

Inventors.
William E. Soong
Jack W. Thomsen
Barry L. Clark
By John E. Peele Jr. Attys United States Patent Office 3,337,147

Patented Aug. 22, 1967

3,337,147

WEB SUPPLY MOUNT FOR WEB HANDLING APPARATUS

William E. Soong, Chicago, and Jack W. Thomsen, La Grange Park, Ill., assignors to Bell & Howell Company, Chicago, Ill., a corporation of Illinois Filed June 30, 1965, Ser. No. 468,379
19 Claims. (Cl. 242—55.11)

The present invention relates to a web handling apparatus and particularly to a foldable web supply mounting structure on which either a cartridge loaded supply or a reel loaded supply may be supported and driven.

The present invention particularly provides a web handling apparatus having built-in adapter structure which permits it to be used with either a cartridge loaded or a reel loaded web supply. In the preferred embodiment of the invention, the web handling apparatus is a motion picture projection apparatus and the web is motion picture film. The adapter is connected to the projection apparatus and has no loose components which may be misplaced when the operator changes between a cartridge loaded and a reel loaded film supply. In addition, when the projection apparatus housing is closed for storage, the resulting package is no larger than a projector which has only a reel load film supply. The film supply adapter structure is designed to handle cartridges with up to 400 feet of film loaded therein. Additionally, a reel support arm attached to the adapter structure enables the use of up to a 400 foot capacity reel of film, the largest size normally available for an 8 mm. projector. During cartridge operation, the reel support arm is pivotable out of the operative reel load position. This movement is necessitated by the fact that the reel supporting spindle thereon would normally block location of a cartridge on the mounting structure.

To maintain the adapter structure in its operative position, a retaining device is provided which enables the mounting structure to be readily erected and folded, yet maintained in properly aligned position against inadvertent disturbance when erected. Similarly, the reel support arm is provided with a latching device to enable it to be readily located in operative position and removed therefrom.

Thus, a general object of the present invention is to provide for a web handling apparatus, a novel movable web supply mounting structure.

Another object of the present invention is to provide a movable web supply mounting structure adapted to alternatively support a reel loaded web supply and a cartridge loaded web supply.

Yet another object is to provide an adapter structure which is releasably retained in operative position and readily released for movement into storage position.

Still another object is to provide a cartridge mounting structure having a built-in reel adapter structure which is readily movable between a reel supporting position and an inoperative positive; the latter of which enables locating of the cartridge on the mounting structure.

The adapter of the present invention enables the construction of a compact motion picture projector which accepts film supplied either in a cartridge or on a reel. The projector is provided with a powered drive to feed the film from the cartridge and to wind film back into the cartridge or onto the reel during reverse projector operations. The adapter, in the form of a film supply mounting structure, is movable between a storage position and an operative position, in which it is retained by a releasable member. On this structure, besides certain cartridge aligning and driving components, is mounted a reel support arm which is movable into and out of a reel supporting position. Thus, it is seen that the desired projector operations of a cartridge projector adapted to also support reels can be readily accomplished.

To better understand this invention and other objects thereof, reference should be made to the accompanying drawings wherein.

Figure 1:
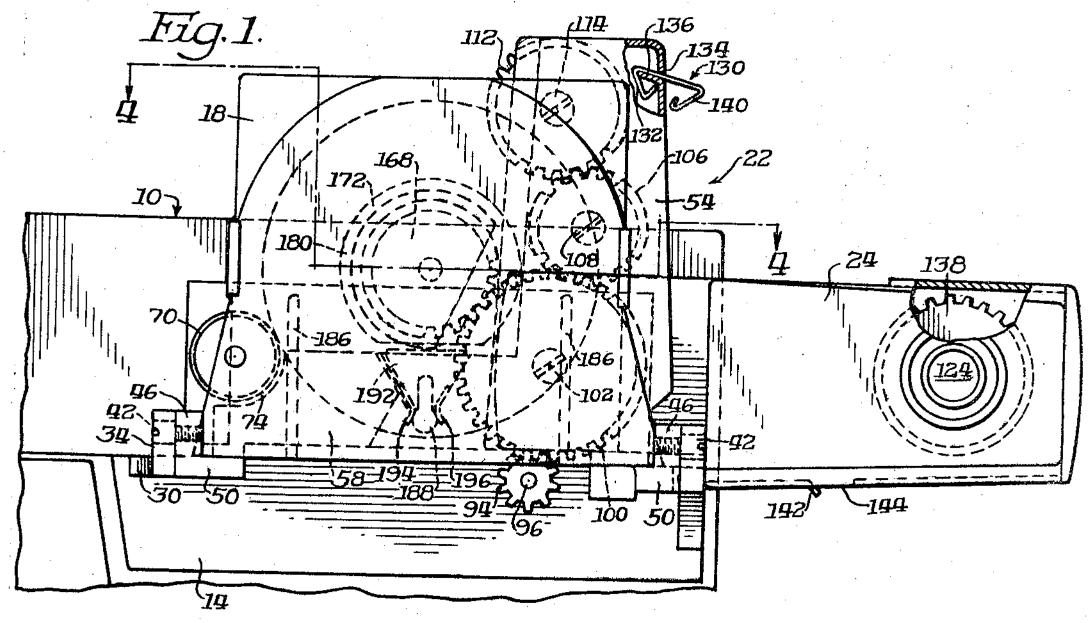
FIG. 1 is a view of the film supply mounting structure with a cartridge in place, broken away in part.

Disclosed in the drawings is a housing 10 of a web handling apparatus, such as a motion picture projection apparatus. Fixedly mounted on this housing 10 is a mechanism support plate 14. An elongated web, such as film 16, loaded in a cartridge 18 (FIG. 1) or on a reel 20 (FIG. 2) is fed to and through the projector in a manner which forms no part of the present invention. A film supply mounting structure 22 is pivotally mounted on mechanism support plate 14. In FIG. 1, the cartridge film supply 18 is disclosed in operative position the mounting structure. A reel adapter structure or reel support arm 24, pivotally mounted on the mounting structure 22, is disclosed pivoted out of reel feeding position. When reel support arm 24 is erected (as in FIG. 2), a reel 20 can be supported on the mounting structure.

Figure 4:
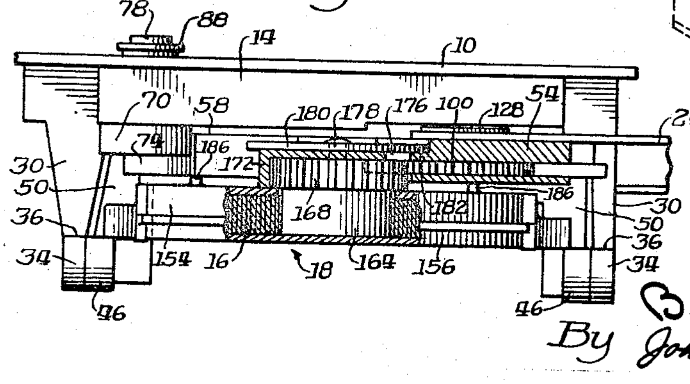
FIG. 4 is a sectional plan view of the film supply mounting structure with a cartridge thereon, taken along line 4—4 in FIG. 1.

The mounting structure 22 is pivotally supported on a pair of rigid arm members 30, 30 which extend outwardly from support plate 14. The arm members 30, 30 terminate in hinge support portions 34, 34 with inwardly facing surfaces 36, 36 (best seen in FIG. 4). Surfaces 36, 36 aid in aligning the cartridge 18 as it is seated on the mounting structure 22. They also aid in preventing inadvertent dislodging of the cartridge. Through each hinge support portion 34, 34 is inserted a hinge shaft member 42 which extends axially into a pair of hinge portions 46, 46 formed as the ends of a pair of shelf members 50, 50 extending from the mounting structure 22. The resulting hinge structure defines a support means to enable movement of the mounting structure between an operative position and a storage position (respectively in solid lines and broken lines in FIG. 5). In this preferred embodiment, the movement takes the particular form of pivoting about an axis essentially parallel with the face of the support plate. However, other forms of movements, such as sliding of the mounting structure on the support plate, and pivoting of the structure about another axis, are contemplated.

Figures 2, 3:
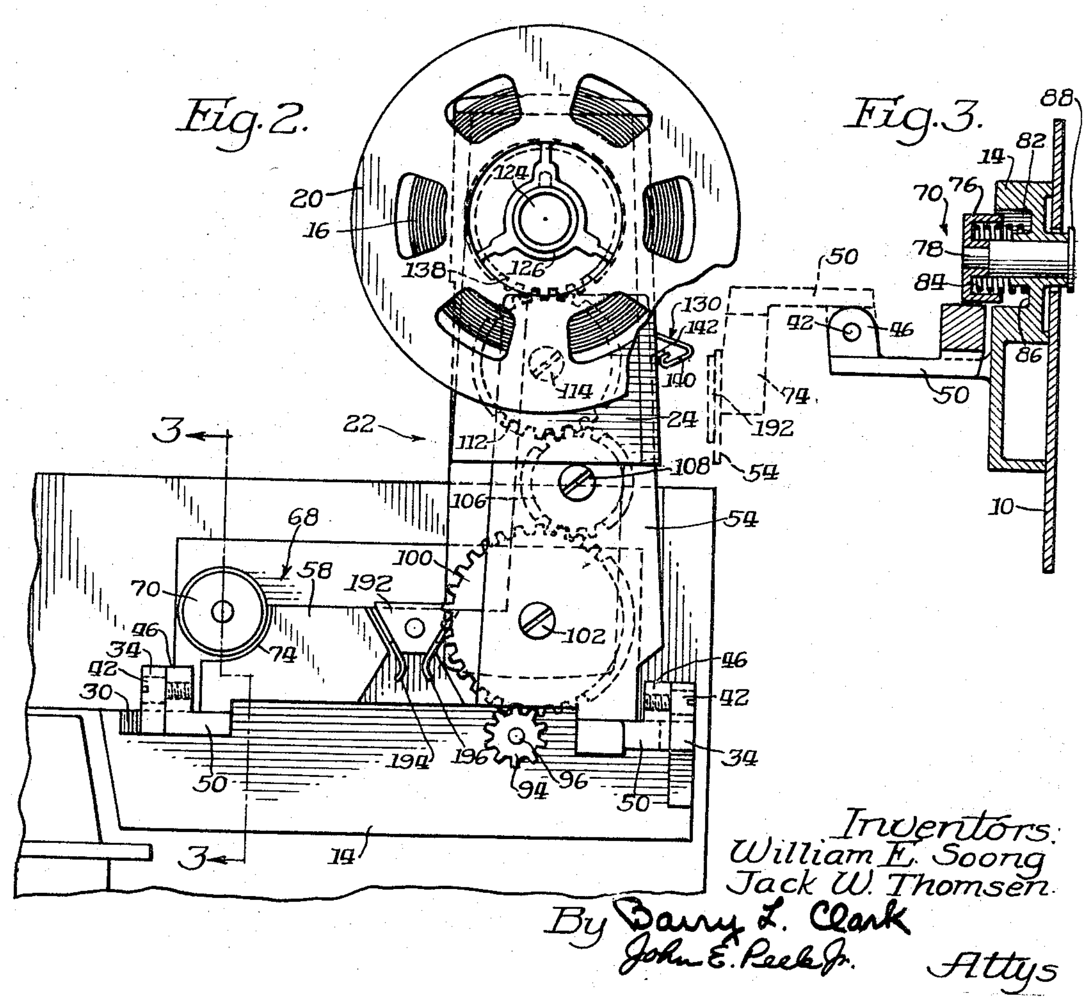
FIG. 2 is a view of the film supply mounting structure with a reel in place, broken away in part.
FIG. 3 is a sectional view taken along line 3—3 in FIG. 2, with the mounting structure alternatively shown in dotted lines in storage position.

The mounting structure 22 comprises main components of a generally upright cartridge aligning portion 54 and a generally horizontal bar portion 58. Because the structure is movable between its operative position and its storage position, a retaining means 68 maintains the mounting structure in the operative position. The retaining means comprises a manually releasable retaining member, such as button 70, which cooperates with a retainer socket 74 formed in bar portion 58. As illustrated in FIG. 3, button 70, formed of a shell 76 connected to a rod 78, is axially depressable into a recess 82 in mechanism support plate 14. A resilient means 84, such as a coiled spring, is positioned about rod 78 between a reduced support plate portion 86 and the interior of shell 76 to urge the button outwardly of recess 82. A lock ring 88 is located about the end of rod 78 behind reduced portion 86 to prevent resilient means 84 from forcing shell 76 and rod 78 from operative relation in the mechanism support plate.

The socket 74 is of a shape complementary to the exterior of button shell 76. The button 70 is sufficiently recessed and enclosed in socket 74 to prevent its being inadvertently pressed or forced from the socket. Application of manual pressure on shell 76 causes it to clear socket 74 to permit the mounting structure 22 to be released and pivoted from its operative position to its folded or storage position. When the mounting structure is returned to its operative position, its back presses the button 70 inwardly until the shell 76 is cleared and urged by resilient means 84 into socket 74. Therefore, it is readily seen that the mounting structure is easily movable about the hinge structure between a storage position and an operative position in which it is maintained by the retaining means. The upright or cartridge aligning portion 54 of mounting structure 22 serves as a support for a power transfer means, which may be composed of a plurality of gears, frictionally engaging rollers or the like, forming a power train to transmit driving power from a powered drive means, such as gear 94, to the film supply. The powered gear 94 is mounted on a shaft 96 driven by the projector motor (not shown). The power train is operated to feed film 16 from the cartridge 18 during initial forward projector operations, and to rewind film into cartridge 18 or onto reel 20 during reverse projector operations. When mounting structure 22 is moved into operative position, a first driving means of the power train, such as core driving gear 100, is moved into mesh with powered gear 94. This core driving gear 100 is mounted on upright 54 to rotate about a shaft 102 thereon. Core driving gear 100 meshes at another point on its periphery with an idler component of the power train, such as gear 106. The idler gear 106 is mounted on a shaft 108 supported in upright 54. A combination core and reel driving or second component, such as gear 112, is mounted near the top of upright 54 to be rotatably driven about a shaft 114 when the idler gear 106 is driven. Hence, the power train is seen to be driven only when the mounting structure 22 is in operative position and one component of said train is in operative engagement with said powered drive gear 94.

Figure 5:
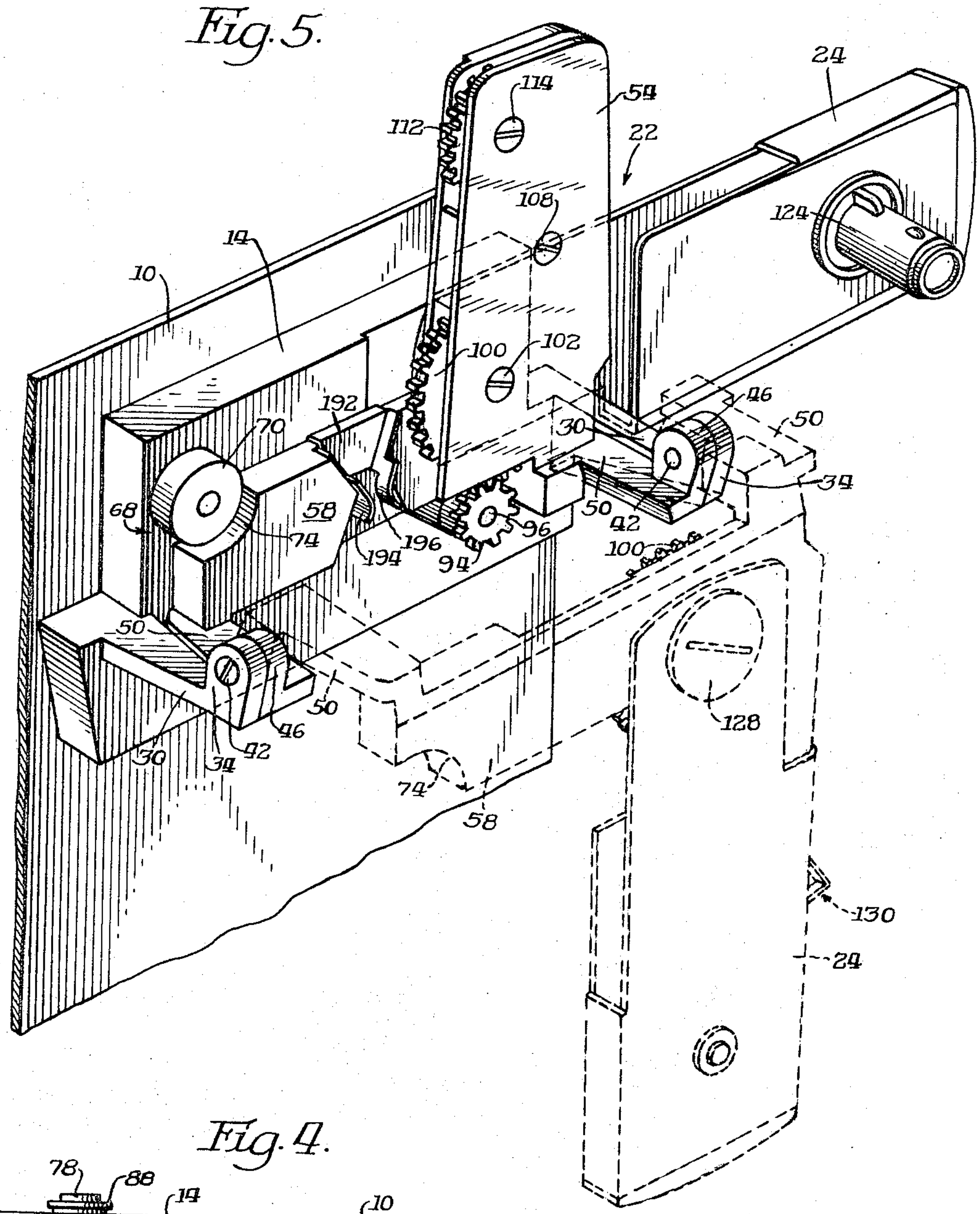
FIG. 5 is a perspective view of the film supply mounting structure, with that structure disclosed in dotted lines in the storage position.

Reel support arm 24 supports a reel mounting spindle 124 on which a hub 126 of the reel 20 may be positioned. The reel arm is mounted for movement about a pivot axle 128 (herein disclosed as an end of shaft 102) supported intermediate the length of the elongated upright 54. When reel arm 24 is moved about pivot 128 from an inoperative or cartridge feeding position (as seen in FIG. 1) to a reel driving or storage position (as seen in FIGS. 2 and 5), a spindle drive means, such as gear 128, located within the arm, is moved into mesh with the combination gear 112. The spindle 124, fixed to gear 138, is thus driven through the power train when the powered gear 94 is operated.

The reel support arm 24 is maintained in its operative or storage positions on upright 54 by a releasable latch means 130, comprising a latch member, such as a shaped spring member 131 and a latch member receiver 144. Spring member 131 includes an angled leg 132 which is positioned over a ledge 136 interior of the upright. A similar leg portion 140 is formed on the exterior end of latch member 131, which extends outwardly of the upright through a slot 134 to pass through a latch member receiver or slot 144 on reel arm 24 to engage a lip portion 142 adjacent receiver 144 so as to retain the arm in erected position. Release of latch means 130 is accomplished by manually pushing the leg 140 upwardly so that it rides over lip portion 142 and through slot 144 as arm 24 is moved clockwise toward the inoperative position (as shown in FIG. 1). Movement of arm 24 into its reel driving position requires only that it be moved so that leg 140 snaps over lip portion 142 into retaining engagement. Thus, the reel support arm is understood to be releasably retained in reel supporting and driving position and readily released for movement to a position permitting location of any sized cartridge upon the mounting structure.

The cartridge 18, as illustrated in FIGS. 1 and 5, is assembled from two casing sections 154, 156 enclosing a core 164 about which is wound the film 16. Core 164 is either integral with or attached to a core gear 168, which is axially located beyond the normal exterior plane of one casing section. A generally cylindrical shield 172 extends outwardly from that housing section. Shield 172 has an access opening 176 permitting the core gear 168 of a small cartridge to mesh with the lower gear 100, and of larger cartridges with the upper gear 112 when the respective cartridge is positioned on the mounting structure 22. A pin 178 forms the rotation axis about which core 164 and core gear 168, as a film moving means, rotate to move the film within said cartridge when said core is ultimately driven by said powered drive gear 94. The pin extends through a backing plate 180 fixedly attached to the free annular end of shield 172, which is of a slightly smaller diameter than the backing plate.

To locate cartridge 18 on the previously erected mounting structure 22, the cartridge is positioned adjacent the upright 54 of the mounting structure, and then lowered with backing plate 180 aligned with a guide recess 182 formed in the rearward side of the upright 54. A pair of ribs 186, 186 on cartridge casing section 154 ride against the face of the upright and bar 58 to maintain the cartridge properly spaced therefrom. As the bottom of cartridge 18 approaches shelf member 50, a key-shaped lug 188 formed integrally near the bottom of casing section 154, enters a clip 12 fixed to bar 58 of the mounting structure. The clip 192, preferably of a deformable metal, is shaped to retain lug 188 snapped between a pair of wing portions 194, 196 thereof, and to urge the cartridge flat against shelf portions 50, if the operator has failed to do so. Hence, cartridges of different capacities may be properly positioned and releasably retained in driving relation on said mounting structure.

Thus, it is seen that either a cartridge or a reel may be supported on a projection apparatus incorporating the present novel mounting structure 22. Operation of such an apparatus may be initiated after quickly erecting the mounting structure from its storage position into its operative position, in which it is maintained by the seating of the releasable retaining button 70 in a retainer socket 74 of the mounting structure. The mounting structure is now ready to accept a reel on the spindle 124 supported on the reel support arm 24 which by the latch means 130 is held in reel driving position relative to the mounting structure. To locate a magazine in the mounting structure, the arm 24 must be unlatched and moved to an inoperative position to clear the cartridge aligning means so that the cartridge may be moved into operative position on the mounting structure with the core gear 168 of the cartridge in operative engagement with one of the power transfer gears 100, 112 in the mounting structure. When the mounting structure was erected, one of the power transfer gears was moved into engagement with a powered drive gear extending from the projector. Thus, depending upon whether the cartridge or the reel is on the mounting structure, the power transfer gears are operable as necessary. When projection is completed and the cartridge or reel removed from the mounting structure, the reel support arm is returned to or left in latched relationship on the mounting structure, and the releasable retaining means operated to release the mounting structure for movement into the storage position as the desired compact package.

Although a specific embodiment of the invention has been described, it is to be understood that modifications and variations may be made therein without departing from the scope of the novel concepts thereof.

We claim as our invention:

1. In a web handling apparatus having a housing and an accessible powered drive means on said housing, the improvement comprising:
- a mounting structure;
- support means to connect said mounting structure to said housing for movement between an operative position and a storage position relative to said housing;
- power transfer means on said mounting structure adapted to be in power transferring relationship with said powered drive means when said mounting structure is in said operative position; and
- aligning means on said mounting structure to locate a web supply cartridge in operative position on said mounting structure when said mounting structure is in operative position whereby a web moving means of said cartridge is in operative engagement with said power transfer means.

2. The apparatus of claim 1 wherein said power transfer means comprises:
- first driving means adapted to be in operative engagement with said powered drive means when said mounting structure is in said operative position; and
- a second driving means in operative relationship with said first driving means whereby power is transferred from said powered drive means when said first driving means is driven by said powered drive means.

3. The apparatus of claim 1 including retaining means for maintaining said mounting structure in said operative position.

4. In a web handling apparatus having a housing, a mechanism support plate on said housing, and an accessible powered drive means positioned relative to said mechanism support plate, the improvement comprising:
- a mounting structure;
- support means to connect said mounting structure to said support plate for movement between an operative position and a storage position;
- power transfer means on said mounting structure adapted to be in power transferring relationship with said powered drive means when said mounting structure is in said operative position;
- a reel support arm;
- means supporting said arm on said mounting structure between a reel driving position and an inoperative position;
- a spindle extending from said arm; and
- spindle drive means in said arm adapted to operatively connect said spindle and said power transfer means when said arm is in said reel driving position and said mounting structure is in said operative position.

5. The apparatus of claim 4 wherein said power transfer means comprises:
- first driving means adapted to be in operative engagement with said powered drive means when said mounting structure is in said operative position;
- second driving means in operative relationship with said first driving means whereby power is transferred from said powered drive means when said first driving means is driven by said powered drive means whereby said spindle drive means is adapted to be in operative engagement with said second driving means when said reel support arm is in said reel driving position.

6. The apparatus of claim 4 including latch means for latching said reel arm into reel driving position.

7. The apparatus of claim 4 including retaining means on said housing and said mounting structure for maintaining said mounting structure in said operative position.

8. In a web handling apparatus having a housing, and a powered drive means on said housing, the invention comprising:
- a mounting structure;
- a support means to connect said mounting structure to said housing for movement between an operative position and a storage position;
- power transfer means on said mounting structure adapted to be in power transferring relationship with said powered drive means when said mounting structure is in said operative position;
- a reel support arm;
- means supporting said arm on said mounting structure for movement between a reel driving position and an inoperative position;
- a spindle extending from said arm;
- spindle drive means in said arm adapted to operatively connect said spindle and said power transfer means when said arm is in said reel driving position; and
- aligning means on said mounting structure to locate a cartridge in operative position on said mounting structure when said mounting structure is in said operative position and said arm is in said inoperative position whereby a web moving means on said cartridge is in operative engagement with said power transfer means.

9. In a motion picture projection apparatus having a housing, a mechanism support plate on said housing, and an accessible powered drive means extending from said mechanism support plate, the improvement comprising:
- a mounting structure adapted to alternatively mount a cartridge and a reel;
- support means to connect said mounting structure to said support plate for movement relative thereto between an operative position and a storage position;
- releasable retaining means and retainer means respectively on one of said support plate and said mounting structure adapted to cooperate and maintain said mounting structure in said operative position;
- power transfer means on said mounting structure adapted to be in power transferring relationship with said powered drive means when said mounting structure is in said operative position;
- a reel support arm;
- means supporting said arm on said mounting structure for movement between a reel driving position and an inoperative position;
- a spindle extending from said arm;
- spindle drive means in said arm adapted to operatively connect said spindle and said power transfer means when said arm is in said reel driving position; and
- aligning means on said mounting structure to locate a cartridge in operative position on said mounting structure when said mounting structure is in said operative position and said arm is in said inoperative position whereby a film moving means of said cartridge is in operative engagement with said power transfer means.

10. The apparatus of claim 9 wherein said power transfer means comprises:
- first driving means adapted to be in operative engagement with said powered drive means when said mounting structure is in said operative position; and
- second driving means in operative relationship with said first driving means whereby power is transferred from said powered drive means when said first driving means is driven by said powered drive means.

11. The apparatus of claim 10 wherein said spindle drive means is adapted to be in operative engagement with said second driving means when said reel support arm is in said reel driving position.

12. The apparatus of claim 9 including a clip means on said mounting structure to releasably retain said cartridge thereon.

13. The apparatus of claim 9 including a latch member and a latch receiver respectively on one of said mounting structure and said reel support arm for releasably latching said reel arm into reel driving position.

14. The apparatus of claim 13 wherein said mounting structure includes an upright portion on which said one of said latch member and said latch receiver is located.

15. The apparatus of claim 9 wherein said reel support arm is mounted for pivoting movement on said mounting structure.

16. The apparatus of claim 9 wherein said support means is a hinge structure.

17. The apparatus of claim 9 wherein said power transfer means is a gear train, and said powered drive means is a gear.

18. The apparatus of claim 17 wherein said spindle drive means includes a gear adapted to mesh with one of said gears of said gear train when said reel support arm is in said reel driving position.

19. In a motion picture projection apparatus having a housing, a mechanism support plate on said housing, an accessible powered drive means extending from said mechanism support plate, the improvement comprising:

a mounting structure adapted to alternatively mount a cartridge and a reel;

hinge structure to connect said mounting structure to said support plate for movement relative to said support plate between an operative position and a storage position;

a releasable mounting structure retaining means on said support plate;

retainer means on said mounting structure to cooperate with said releasable retaining means to maintain said mounting structure in said operative position;

power transfer means on said mounting structure adapted to be in power transferring relationship with said power drive means when said mounting structure is in said operative position;

a reel support arm;

means supporting said arm on said mounting structure for movement between a reel driving position and an inoperative position;

a latch member and a latch receiver respectively on one of said mounting structure and said reel support arm for releasably latching said reel support arm into reel driving position;

a spindle extending from said arm;

a spindle drive gear in said arm adapted to operatively connect said spindle and said power transfer means when said arm is in said reel driving position;

aligning means on said mounting structure to locate a cartridge in operative position on said mounting structure when said mounting structure is in said operative position and said arm is in said inoperative position whereby a film moving means of said cartridge is in operative engagement with said power transfer means; and means on said mounting structure to releasably retain said cartridge thereon.

References Cited

UNITED STATES PATENTS

| | | | |
|---|---|---|---|
| 2,449,705 | 9/1948 | Jones | 352—72 |
| 2,645,430 | 7/1953 | Beacom | 242—55.11 X |
| 3,176,130 | 9/1962 | Finnerty | 352—29 |

LEONARD D. CHRISTIAN, *Primary Examiner.*